United States Patent Office 2,879,306
Patented Mar. 24, 1959

2,879,306

PRODUCTION OF DIOLS BY HYDROGENATION OF POLYMERIC PEROXIDES OF DIOLEFINS

William M. Hutchinson, Bartlesville, Okla., assignor to Phillips Petroleum Company, a corporation of Delaware No Drawing. Application March 25, 1952
Serial No. 278,503

19 Claims. (Cl. 260—635)

This invention relates to the preparation of diols from conjugated diolefins. In one aspect it relates to the preparation of diols, such as 1,4-butanediol, from conjugated diolefin oxidation products, such as 1,3-butadiene peroxide. In another aspect it relates to the preparation of a diol by hydrogenation of a conjugated diolefin oxidation product. In still another aspect it relates to the hydrogenation of a conjugated diolefin oxidation product employing a basic or neutral catalyst. In a further aspect it relates to a manner of hydrogenating a conjugated diolefin oxidation product according to which account is taken of the catalyst activity in respect of hydrogenation. In a still further aspect the invention relates to a two-stage hydrogenation of a conjugated diolefin oxidation product in each of which there is employed a catalyst and conditions suited to minimize the proportion of side-reaction materials, notably carbonylic oxidation materials, found in the diol product either due to their presence in the feed to the first stage hydrogenation or their formation in said stage, by conversion of said materials in a second stage to additional quantities of diols.

In the prior art the hydrogenation of an oxidation product of 1,3-butadiene employing a catalyst and conditions there disclosed has resulted in a product which appeared to be composed substantially completely of formaldehyde and associated scission products, K. Bodendorf, Archive Pharmazie, 271, 1–35 (1933).

I have now discovered a novel process for the production of diols, such as 1,4-butanediol, from the catalytically activated hydrogenation of oxidation products of conjugated diolefins, wherein the formation of certain aldehydes, formaldehyde when the oxidation product of 1,3-butadiene is used, is eliminated and the ultimate formation of other aldehydes is substantially reduced. When formed, said aldehydes, $C_4$ aldehydes in the case of the oxidation product of 1,3-butadiene, are ultimately converted to diol product. The process of my invention is a hydrogenation process effected in a series of integrated steps.

I have also found that by the use of a non-acidic, that is a neutral or basic hydrogenation catalyst as contrasted with the acidic catalyst of the prior art, relatively high yields of diols corresponding in carbon skeleton configuration with the diolefin starting materials are realized and the formation of formaldehyde is avoided.

I have found, further, that in the preparation of diols by the catalytically activated hydrogenation of conjugated diolefin oxidation products that the hydrogenation catalyst employed must be of such nature and in such a state that it is an active hydrogenation catalyst. Thus, the hydrogenation is initiated using an active hydrogenation catalyst such as palladium-on-charcoal and is halted prior to the point at which hydrogenation activity is lost. Such a procedure is essential to the efficient operation of my process, since a hydrogenation catalyst which has been exhausted will continue to activate the conversion of the peroxidic starting materials to aldehydes having a carbon skeleton corresponding to that of the diolefin starting material or multiples thereof. The reaction mixture is then freed of catalyst by suitable means, and recharged with fresh catalyst which may be the same or different from the catalyst replaced. Further hydrogenation is then effected to convert additional materials to diols, said procedure being repeated until the desired amount of diol formation has been effected.

While diol formation is high when operating with an active hydrogenation catalyst in a single stage, in the manner described, it is preferred to carry out the reaction in two stages utilizing an active hydrogenation catalyst in the first stage and completing the hydrogenation using a catalyst capable of activating the hydrogenation under the more drastic conditions of operation in a second stage. I have found, when operating in two stages, as stated, that carbonylic oxidation products other than peroxides are also converted to diols with resultant increased yields.

Therefore, according to this invention there is provided a process for the preparation of a diol from an oxidation product of a conjugated diolefin which comprises subjecting said oxidation product to hydrogenation conditions in the presence of a basic or neutral hydrogenation catalyst, for example about 10% palladium on activated charcoal, until peroxides in said oxidation product are reduced; halting the hydrogenation operation and then further hydrogenating the hydrogenation product thus obtained in presence of a catalyst, for example a copper-chromite catalyst, under more drastic conditions.

Starting materials applicable to use in the present invention can be prepared by oxidation of conjugated diolefins of the formula:

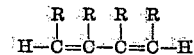

wherein the R's can be hydrogen, or methyl groups and at least two of the R's are hydrogen. Typical conjugated diolefins applicable to the preparation of starting materials for the present invention include 1,3-butadiene, isoprene (2-methyl-1,3-butadiene), piperylene (1,3-pentadiene), 2,3-dimethyl-1,3-butadiene, and the like.

The diols of the present invention will contain the same number of carbon atoms and have the same carbon skeleton as the starting material employed. 1,2- and/or 1,4-configurations can be obtained. Thus, when 1,3-butadiene is the starting material 1,2- and 1,4-butane diols are obtained.

The above diolefins can be converted to starting materials by any suitable oxidation process wherein a substantial portion of diolefin is converted to peroxidic polymer. I have prepared starting materials, i.e., crude oxidation materials by liquid phase oxidation of a candidate conjugated diolefin with air or oxygen. When operating by the method which I have employed, the conjugated diolefin oxidation reaction can be conducted in any suitable pressure reactor provided with means to thoroughly mix air or oxygen and diolefin. Contact times in the oxidation step will be from 0.1 to 25, preferably 1 to 5 hours in duration. Said oxidation step is conducted within the temperature range of 50° C. to 150° C. and at a partial pressure of oxygen above 20 pounds per square inch and generally not over 4000 pounds per square inch. Preferred operation will be in the range from 100 to 400 pounds per square inch. The total pressure of the system will be sufficient to maintain a conjugated diolefin liquid phase. I have usually preferred to employ an initiator to start the oxidation reaction. Suitable materials which can be used for this purpose include peroxides or hydroperoxides, diazothioethers, and others known in the art. Oxidation promoters such as acetaldehyde, cobalt linoleate, and the like are also employed in the oxidation reaction. The oxidation effluent will comprise polymeric peroxidic materials containing repeating units of the types (1) 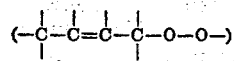

(2) 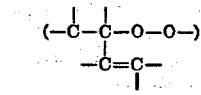

which are referred to as diolefin peroxides, together with carbonylic compounds having the same carbon skeleton as the diolefin starting material or multiples thereof. In the claims the skeletal arrangement of the carbon atoms in the above formulas is referred to as R'.

At the end of the oxidation period, unreacted diolefin is removed and the oxidation materials are transferred to the hydrogenation zone. The hydrogenation is carried out in the presence of a solvent which can be added subsequent to the oxidation or more preferably can be present during the oxidation. If the oxidation is carried out in a solvent, additional amounts can be added subsequent to said oxidation. The solvent used can be dioxane, benzene, tetrahydrofurfuryl alcohol or the like. I have generally operated with a peroxide to solvent ratio in the range of 1:100 to 1:4 parts by weight. Use of said solvent provides convenient and safe handling of the peroxide against possible decomposition which might otherwise be dangerous.

Suitable catalysts for first stage hydrogenation are neutral or basic in character and include palladium, nickel, rhodium, cobalt, platinum, and the like either supported or unsupported. Temperatures in the first hydrogenation stage will be in the range from 20 to 150° C., preferably 25 to 75° C. Any suitable pressure above 20 pounds per square inch gauge can be used, 200 to 1500 pounds per square inch gauge being a preferred operating range.

Second stage hydrogenation is conducted using a catalyst capable of operating under more stringent conditions of operation than first stage hydrogenation. In said second stage, copper chromite, molybdenum sulfide, nickel or other catalyst capable of retaining its hydrogenation activity under the conditions of the reaction is employed. Temperatures will be in the range of 50 to 250° C. preferably 100 to 200° C. and any desired pressure within the capacity of the equipment, above about 200 pounds per square inch gauge can be employed, 500 to 1500 pounds per square inch gauge being a preferred operating range.

Hydrogenation periods for the individual hydrogenation steps of the first stage will be in the range from 5 minutes to 50 hours, preferably from about 1 to 10 hours in length. Second stage hydrogenation steps will be in the range from 30 minutes to 50 hours in length, preferably from about 2 to 25 hours in length.

EXAMPLE I

*Diol production—high pressure hydrogenation*

A. *Oxidation of 1,3-butadiene.*—A run was made wherein 1,3-butadiene in liquid state was charged to a pressure reactor along with a small amount of cobalt linoleate catalyst and a small amount of benzoyl peroxide in itiator. After charging, compressed air was introduced until a pressure of 500 p.s.i.g. was attained in the reactor. Stirring was started and heat was applied to the reactor. After the desired temperature was attained, 71° C., pressure within the reactor was raised to 800 p.s.i.g. with compressed oxygen.

The course of the reaction was followed by observing the drop in pressure within the reactor. When the pressure had decreased to a predetermined level, usually about 700 p.s.i.g., oxygen was added until 800 p.s.i.g. was again attained. Oxygen consumption was calculated from the gas phase in the reactor and the total pressure drop during the oxidation.

After the desired amount of oxygen had been consumed the reaction was terminated as follows: The temperature was quickly reduced by pumping cold water through an internal cooling coil of the reactor. On reaching a temperature of about 38° C., oxygen was vented and unreacted butadiene removed after which dioxane, (800 cc.), was pumped into the reactor to dissolve the oxidation products.

Charge to reactor, conditions, and results of the oxidation are recorded in the following tabulation:

Charge:
 1,3-butadiene _____grams__ 880.2
 Cobalt linoleate _____do____ 0.8
 Benzoyl peroxide _____do____ 1.5

Conditions:
 Temperature _____ ° C__ 71–82
 Pressure _____p.s.i.g.__ 700–800
 Duration _____hours__ 5.43

The dioxane solution contained 10.85 weight percent of 1,3-butadiene peroxide based on $C_4H_6O_2$ units as determined by titration with sodium thiosulfate.

B. *High pressure hydrogenation of 1,3-butadiene oxidation products to form diols.*—550 grams of a dioxane solution containing the above oxidation product and having a concentration of 7.8 weight percent of peroxidic oxidation product calculated as 1,3-butadiene peroxide, was charged to a high pressure hydrogenator along with 0.5 gram of 10 percent palladium-on-charcoal catalyst (commercial product) and hydrogenated in two stages as described below:

STAGE I

| Step | Catalyst, amount | Duration | Hydrogen Pressure, p.s.i.g. | Temperature, ° C. |
|---|---|---|---|---|
| 1 | 0.5 g. 10% Palladium on charcoal. | 18 hrs.,[1] 20 mins. | 500–800 | 20–28 |
| | Catalyst removed by filtration | | | |
| 2 | 0.4 g. 10% Palladium on charcoal. | 2 hrs., 15 mins. | 600–700 | 21–40 |
| | Catalyst not removed at this point since its activity was still high | | | |
| 3 | 1.0 g. 10% Palladium on charcoal (added). | 17 hrs.,[1] 30 mins. | 700–800 | 32–48 |
| | Catalyst removed by filtration | | | |

[1] The course of the hydrogenation was followed by observing the drop in hydrogen pressure within the reactor. Such observation indicated that most of the hydrogenation occurred in the first two hours of operation. Therefore according to the invention the hydrogenation should here be halted within about two hours time.

STAGE II

| Step | Catalyst, amount | Duration, hours | Hydrogen Pressure, p.s.i.g. | Temperature, ° C. |
|---|---|---|---|---|
| | (445.3 grams of solution of Stage I, Step 3 charged to hydrogenator) | | | |
| 1 | 10 g. copper chromite | 20 | 700–800 | 150–181 |

The reaction effluent was filtered to remove catalyst, stripped of dioxane solvent, and then fractionated. Fractionation data, yields of products and identification of said products are recorded below:

TABLE I

| Fraction Number | Head Temperature, °C. | Pressure, mm. Hg | Weight of Fraction, Grams | Observed Atmospheric Boiling Point of Fraction,[1] °C. | Refractive Index, $n_D^{20}$ |
|---|---|---|---|---|---|
| 1 | 100-116 | 47 | 1.8 | 182 | 1.4403 |
| 2 | 116-118.5 | 47 | 7.3 | 194 | 1.4380 |
| 3 | 118.5-115 | 47-46 | 7.0 | 195 | 1.4372 |
| 4 | 115.72 | 46-3 | 4.7 | 196 | 1.4380 |
| 5 | 75.95 | 3 | 2.3 | 203 | 1.4400 |
| 6 | 95.101 | 3.2 | 2.5 | 219 | 1.4462 |
| 7 | 101-103 | 2 | 12.6 | 229 | 1.4470 |
| 8 | 103 | 2 | 8.5 | 229 | 1.4468 |
| 9 | 103 | 2 | 5.0 | 230 | 1.4460 |
| 10 | 103-143 | 2.4 | 1.8 | 237 | 1.4590 |
| 11 | 143-144 | 4 | 2.5 | 274-6 | 1.4657 |
| 12 | 144-173 | 4.1 | 2.1 | | 1.4712 |
| 13 | 173-168 | 1 | 1.6 | 285-317 | 1.4756 |
| Residue | | | 6.9 | | |

[1] Barometer, 726.9 mm./Hg corrected.

TABLE II

The weights of materials recorded in the following tabulation were employed in calculating product yields. Said weights were obtained by using a temperature plot of the fractionation in conjunction with the fractionation data of Table I.

| Component | Weight, grams | Carbon Weight, percent | Carbon Gram-Atoms | $C_4$ Equivalent[1] |
|---|---|---|---|---|
| 1,2-butanediol | 23.2 | 53.3 | 1.03 | 0.257 |
| 1,4-butanediol | 30.4 | 53.3 | 1.35 | 0.337 |
| Total diols | 53.6 | | | .594 |
| Less volatile | 13.1 | [2] 63.4 | 0.69 | 0.172 |
| | | | | 0.766 |

[1] $C_4$ Equivalents = $\frac{\text{Gram-Atoms Carbon}}{4}$
[2] Obtained by analysis.

All material weights were converted to $C_4$ equivalents to provide yield values based on butadiene. The following yields were derived from the $C^4$ equivalent values shown above.

|  | Percent |
|---|---|
| 1,2-butanediol | 34 |
| 1,4-butanediol | 44 |
| Total | 78 |

*Source of butanediols.*—The following data are here included to demonstrate the conversion to diols of oxidation materials other than 1,3-butadiene peroxide charged to the hydrogenator.

| Component | Weight, grams | $C_4$ Equivalents |
|---|---|---|
| 1,3-butadiene peroxide to produce butanediols | 39.9 | 0.464 |
| Total butanediols produced | 53.6 | 0.594 |
| Butanediols from oxidation products other than 1,3-butadiene peroxide (by difference) | | 0.130 |

The amount of butanediols derived from oxidation products other than 1,3-butadiene peroxide represents 21.9 weight percent of total butanediols produced.

TABLE III

*Proof of products.*—Comparison of observed properties of 1,2-butanediol and 1,4-butanediol produced in the present invention with literature values of said materials.

| | Boiling Point, °C. | Melting Points of Derivatives (°C.) | | |
|---|---|---|---|---|
| | | 2,4-dinitro benzoate | bis-naphthyl urethane | Phenyl Urethane |
| Experimental[1]: 1,2-butanediol | 195/727 mm. Hg (Fraction 3, Table I). | 113.6<br>113.6 (mixed) | 164<br>165 (known sample)<br>165 (mixed) | |
| Literature: 1,2-butanediol | 191/755 [2] mm. Hg | | | |
| | | Dibenzoate | | |
| Experimental[1]: 1,4-butanediol | 229/727 mm. Hg (Fraction 8, Table I). | 79.5-81 | 193.5 | 182.7-183 |
| Literature: 1,4-butanediol | 230/759 [3] | 80-81 [4] | 198.5-199 [3] | [3] 183-183. |

[1] Corrected for emergence of thermometer stem.
[2] Handbook of Chemistry and Physics, 31st ed.
[3] Handbook der Organischen Chemie, 4th ed., supplement to vol. I.
[4] Chemical Abstracts 33, 4593 [9].

EXAMPLE II

*Diol production—low pressure hydrogenation*

A. *Oxidation of 1,3-butadiene.*—A run was made according to the method described in Example I where 1,3-butadiene was oxidized with compressed oxygen using benzoyl peroxide as initiator and acetaldehyde as promotor. Approximately 600 cc. of dioxane was employed to remove butadiene oxidation products from the reactor. Charge to reactor, reaction conditions, and results of the oxidation are recorded in the following table:

Charge:
- 1,3-butadiene _____grams__ 880.2
- Acetaldehyde _____do____ 5.2
- Benzoyl peroxide _____do____ 1.5

Conditions:
- Temperature _____°C__ 71-73
- Pressure _____p.s.i.g__ 700-800
- Duration _____hours__ 4.6

The dioxane solution contained 5.64 weight percent of 1,3-butadiene peroxide, calculated as $C_4H_6O_2$ units, as determined by titration with sodium thiosulfate.

B. *Low pressure hydrogenation of 1,3-butadiene oxidation product to form diols.*—The dioxane solution prepared according to the procedure described above was hydrogenated in a rocking type hydrogenator in a series of 5 steps as described below:

Charge to hydrogenator: 100.4 grams of dioxane solution of 1,3-butadiene oxidation product (5.6 wt. percent 1,3-butadiene peroxide)
Temperature: 25-35° C.

| Step | Amount and kind, Catalyst | Duration | Hydrogen Pressure |
|---|---|---|---|
| 1 | 0.5 g. Raney Nickel | 2 hrs., 36 mins | 31-40 p.s.i.g. |

100.0 g. of additional solution of oxidation products was added. One gram of anhydrous Ca(OH)₂ was added to neutralize any acids present and the mixture was filtered. Fresh catalyst was added and hydrogenation continued

| Step | Amount and kind, Catalyst | Duration | Hydrogen Pressure |
|---|---|---|---|
| 2 | 1.0 g. Raney Nickel [1] | 14 hrs., 38 mins | 31-40 p.s.i.g. |
| 3 | 0.1 g. 10% Pd on charcoal.[2] | 4 hrs | 31-40 p.s.i.g. |
| 4 | 0.1 g. 10% Pd on charcoal (additional charge). | 3 hrs., 16 mins | 31-40 p.s.i.g. |
| 5 | ......do...... | 16 hrs | 31-40 p.s.i.g. |

[1] Following step 2 the catalyst was not removed since its activity had not declined to the point where aldehyde formation was effected.
[2] Amount of catalyst reduced because of greater activity of palladium on charcoal than Raney nickel.

The reaction effluent was filtered to remove catalyst and fractionated. Dioxane solvent was removed in the initial fraction. Fractionation data are recorded below:

| Fraction Number | Distillation Temperature, °C. | Pressure (mm. Hg) | Wt. of Fraction (grams) | Refractive Index $n_D^{20}$ | Identification |
|---|---|---|---|---|---|
| 1 | 54-62 | 65 | 27.7 | | Dioxane. |
| 2 | 34-36 | 1.2 | 2.7 | 1.4400 | |
| 3 | 67-68 | 1.2 | 3.9 | 1.4456 | 1,2-butanediol |
| 4 | 73 | 1.0 | 1.7 | 1.4470 | |
| 5 | 89-90 | 0.5 | 5.1 | 1.4531 | 1,4-butanediol. |
| 6 | 100 | 0.5 | 1.4 | 1.4590 | |
| 7 | Residue | | 5.5 | 1.4744 | |

The amount of 1,4-butanediol recovered represents a yield of 35 mol percent based on 1,3-butadiene converted to oxidation products.

EXAMPLE III

*Hydrogenation of butadiene oxidation product according to prior art*

A comparative run was made wherein a 1,3-butadiene oxidation product, prepared by the oxidation procedure described in Example I, was hydrogenated according to the teaching of the prior art. Description of the run and results follow.

*Preparation of palladium on charcoal catalyst.*—0.1 gram palladous chloride was added to 10 ml. water and heated to 80° C. A sufficient amount of 1.5 N hydrochloric acid was added to complete solution of said palladous chloride. Final concentration of hydrochloric acid was 0.3 N. 10 ml. of the above solution was added to 10 grams of animal charcoal (activated), and ground together with drying. After the consistency of the mixture became powdery, a stream of nitrogen gas was passed through the catalyst to remove excess water.

*Hydrogenation.*—91.5 grams of dioxane solution of butadiene oxidation product containing 8.6 grams of peroxidic oxidation product was charged to a hydrogenation reactor along with 0.9 gram of the above catalyst. Hydrogenation was effected at 25° C. and 40 p.s.i.g. About 0.005 mol of hydrogen was absorbed in 24 hours.

Upon distillation of the hydrogenated mixture, 0.5 gram of paraformaldehyde precipitated in the still head and 2.2 grams of formaldehyde or polymers thereof distilled over with dioxane. No evidence of diol formation was noted from said distillation. It appeared that substantially all of the butadiene oxidation starting material was converted either to formaldehyde or to high-boiling resinous materials which could not be distilled.

It is noted that the usual precaution should be observed to prevent a vapor phase explosion with hydrocarbon and oxygen. Diene peroxides should be diluted with a suitable solvent prior to carrying out chemical reactions with them.

Reasonable variation and modification are possible within the scope of the foregoing disclosure and the appended claims to the invention, the essence of which is that conjugated diolefin oxidation products are hydrogenated in a two-stage process in the first stage of which the hydrogenation is halted while the catalyst is still active for hydrogenation and therefore relatively speaking substantially inactive for aldehyde formation, that a basic or neutral catalyst is employed in said first stage, that more drastic hydrogenation is effected in the second stage and that a process, not necessarily effected in a plurality of stages, but which can be effected in one stage has been set forth for hydrogenating said oxidation products to diols.

I claim:

1. A process for the preparation of butanediols, which comprises hydrogenating in the presence of a non-acidic hydrogenation catalyst selected from the group consisting of palladium, nickel, rhodium, cobalt, and platinum, an oxidation product of butadiene comprising polymeric peroxidic materials containing repeating units of the type ⫨R'—O—O⫩ wherein R' is selected from the group consisting of

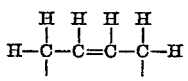

and

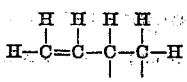

halting said hydrogenation prior to the point at which hydrogenation activity of said catalyst is lost and recovering said diols.

2. A process according to claim 1 wherein the hydrogenation is effected in two stages, in the first of which a non-acidic palladium catalyst is employed and in the second stage of which under more stringent hydrogenation conditions copper-chromite is employed.

3. A process for the preparation of butanediols which comprises hydrogenating an oxidation product of butadiene comprising polymeric peroxidic materials containing repeating units of the type ⫨R'—O—O⫩ wherein R' is selected from the group consisting of

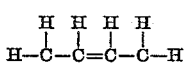

and

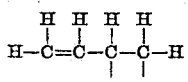

in a first stage in the presence of a non-acidic palladium catalyst while said catalyst is still substantially active for hydrogenation, then removing said catalyst from the reaction mass, adding a catalyst capable of operating under more stringent hydrogenation conditions than employed in the first stage to said mass and continuing to hydrogenate said mass in a second stage and recovering, finally, butanediols from said mass.

4. A process according to claim 3 wherein the non-acidic palladium catalyst is supported on activated charcoal, said oxidation product is dissolved in a suitable solvent, the temperature is in the range 20 to 150° C. in the first hydrogenation and the temperature is in the range 50 to 250° C. in the second mentioned hydrogenation.

5. Hydrogenation of an oxidation product of butadiene comprising polymeric peroxidic materials containing repeating units of the type ⫨R'—O—O⫩ wherein R' is selected from the group consisting of

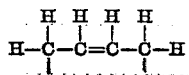

and

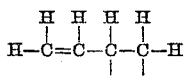

in the presence of a non-acidic palladium catalyst, and recovering diols.

6. A process for the preparation of diols by hydrogenation of a polymeric oxidation product of conjugated diolefins which are of the formula

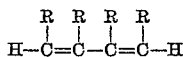

wherein R is selected from the group consisting of hydrogen and methyl and wherein at least two R's are hydrogen, said oxidation product comprising polymeric peroxidic materials containing repeating units of the type ⟨R'—O—O⟩ wherein R' is selected from the group consisting of

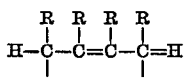

and

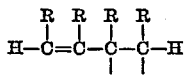

wherein R is selected from the group consisting of hydrogen and methyl and at least two of the R's are hydrogen which comprises dissolving said oxidation product in a suitable solvent and hydrogenating the solution in the presence of a non-acidic hydrogenation catalyst selected from the group consisting of palladium, nickel, rhodium, cobalt, and platinum, only while said catalyst is active for formation of said diols by said hydrogenation and is relatively inactive for the formation of aldehydes, and then discontinuing said hydrogenation, and recovering said diols.

7. A process according to claim 6 wherein the catalyst is palladium on a suitable support.

8. A process according to claim 6 wherein the hydrogenated mass is separated from the catalyst, a catalyst capable of operating under more severe conditions of hydrogenation is then added to said mass and hydrogenation under more severe hydrogenation conditions is effected and finally diols are recovered.

9. A process according to claim 6 wherein the temperature is in the range 20 to 150° C. and the hydrogen pressure is at least about 20 pounds per square inch gauge.

10. A process according to claim 6 wherein the temperature is in the range 20 to 50° C., the catalyst is non-acidic palladium and the pressure is 500 to 800 pounds per square inch.

11. A process according to claim 10 wherein the oxidation product is obtained using 1,3-butadiene.

12. A process according to claim 11 wherein the hydrogenated mass is then further hydrogenated at a temperature in the range 150 to 180° C. and at a pressure of hydrogen in the range 700 to 800 pounds per square inch.

13. A process according to claim 6 wherein the temperature is in the range 25 to 35° C., the catalyst is Raney nickel and the hydrogen pressure is at least about 30 pounds per square inch.

14. A process according to claim 9 wherein the catalyst is Raney nickel.

15. A process according to claim 9 wherein the catalyst is platinum.

16. A process according to claim 9 wherein the catalyst is rhodium.

17. A process according to claim 9 wherein the catalyst is cobalt.

18. A process for the preparation of butanediols, which comprises hydrogenating in the presence of a non-acidic hydrogenation catalyst selected from the group consisting of palladium, nickel, and cobalt an oxidation product of butadiene comprising polymeric peroxidic materials containing repeating units of the type ⟨R¹—O—O⟩ wherein R¹ is selected from the group consisting of

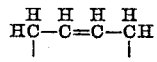

and

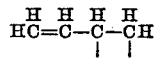

halting said hydrogenation prior to the point at which hydrogenation activity of said catalyst is lost and recovering said diols.

19. A process for the preparation of diols by hydrogenation of a polymeric oxidation product of conjugated diolefins which are of the formula

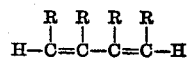

wherein R is selected from the group consisting of hydrogen and methyl and wherein at least two R's are hydrogen, said oxidation product comprising polymeric peroxidic materials containing repeating units of the type ⟨R'—O—O⟩ wherein R' is selected from the group consisting of

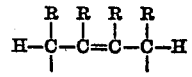

and

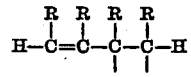

wherein R is selected from the group consisting of hydrogen and methyl and at least two of the R's are hydrogen in the presence of a non-acidic hydrogenation catalyst selected from the group consisting of palladium, nickel, rhodium, cobalt, and platinum, and recovering diols.

References Cited in the file of this patent

UNITED STATES PATENTS 2,484,841   Lorand _____ Oct. 18, 1949

OTHER REFERENCES

Chemical Reviews, vol. 27 (Aug.–Dec. 1940), pp. 453 and 454 (Long).

Bull. Soc. Chim. (France) 1948, pp. 197–203 (Paul et al.) (abstracted in Chem. Abstracts, vol. 42 (1948), p. 4945d).

UNITED STATES PATENT OFFICE
CERTIFICATE OF CORRECTION

Patent No. 2,879,306

March 24, 1959

William M. Hutchinson

It is hereby certified that error appears in the printed specification of the above numbered patent requiring correction and that the said Letters Patent should read as corrected below.

Column 5, Table I, second column thereof, under the heading "Head Temperature, °C.", fourth item, for "115.72" read -- 115-72 --; fifth item, for "75.95" read -- 75-95 --; sixth item, for "95.101" read -- 95-101 --; same Table I, third column thereof, under the heading, "Pressure, mm. Hg", sixth item, for "3.2" read -- 3-2 --; tenth item, for "2.4" read -- 2-4 --; twelfth item, for "4.1" read -- 4-1 --; columns 5 and 6, lines 22 to 35, in the table, last column thereof, under the heading "Phenyl Urethane", last item, for "183-183." read -- 183-183.5 --.

Signed and sealed this 19th day of January 1960.

(SEAL)
Attest:

KARL H. AXLINE
Attesting Officer

ROBERT C. WATSON
Commissioner of Patents